(12) United States Patent
Lee (10) Patent No.: US 9,164,306 B2
(45) Date of Patent: Oct. 20, 2015

(54) IN-CELL TOUCH DISPLAY PANEL SYSTEM USING METAL WIRES TO CONNECT WITH SENSING ELECTRODES

(71) Applicant: SuperC-Touch Corporation, New Taipei (TW)

(72) Inventor: Hsiang-Yu Lee, New Taipei (TW)

(73) Assignee: SuperC-Touch Corporation, New Taipei (TW)

( * ) Notice: Subject to any disclaimer, the term of this patent is extended or adjusted under 35 U.S.C. 154(b) by 144 days.

(21) Appl. No.: 14/019,889

(22) Filed: Sep. 6, 2013

(65) Prior Publication Data

US 2014/0078414 A1    Mar. 20, 2014

(30) Foreign Application Priority Data

Sep. 14, 2012    (TW) .............................. 101217823 U (51) Int. Cl.
| | |
|---|---|
| *G02F 1/1335* | (2006.01) |
| *G02F 1/1333* | (2006.01) |
| *G06F 3/041* | (2006.01) |
| *G06F 3/044* | (2006.01) |

(52) U.S. Cl.
CPC ............ *G02F 1/13338* (2013.01); *G06F 3/041* (2013.01); *G06F 3/044* (2013.01); *G06F 3/0412* (2013.01)

(58) Field of Classification Search
CPC ... G02F 1/13338; G06F 3/041; G06F 3/0412; G06F 3/044
See application file for complete search history.

(56) References Cited

U.S. PATENT DOCUMENTS

| | | | |
|---|---|---|---|
| 2009/0096760 A1* | 4/2009 | Ma et al. ........................ | 345/174 |
| 2009/0102814 A1* | 4/2009 | Lin et al. ....................... | 345/174 |
| 2012/0218199 A1* | 8/2012 | Kim et al. ...................... | 345/173 |

FOREIGN PATENT DOCUMENTS

| | | |
|---|---|---|
| KR | 20090019902 A | 2/2009 |
| KR | 20110108886 A | 10/2011 |
| KR | 20120097765 A | 9/2012 |

\* cited by examiner

*Primary Examiner* — Michael Caley
(74) *Attorney, Agent, or Firm* — Muncy, Geissler, Olds & Lowe, P.C.

(57) ABSTRACT

An in-cell touch display panel system includes: first and second substrates configured therebetween a liquid crystal layer, a black matrix layer, a sensing electrode trace layer, an insulation layer, and a sensing electrode layer. The black matrix layer is composed of a plurality of opaque lines. The sensing electrode trace layer is composed of a plurality of trace conductor lines. The insulation layer is disposed on one surface of the sensing electrode trace layer facing the liquid crystal layer. The sensing electrode layer is composed of a plurality of transparent sensing electrodes obtained from patterning a common voltage layer. Each transparent sensing electrode is connected with at least one trace conductor line, while the plurality of trace conductor lines are disposed corresponding to positions of the plurality of opaque lines of the black matrix layer.

10 Claims, 10 Drawing Sheets

IN-CELL TOUCH DISPLAY PANEL SYSTEM USING METAL WIRES TO CONNECT WITH SENSING ELECTRODES

BACKGROUND OF THE INVENTION

1. Field of the Invention

The present invention relates to a structure of touch display panel and, more particularly, to an in-cell touch display panel system using metal wires to connect with sensing electrodes.

2. Description of Related Art

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technologies were invented to overcome the drawbacks of traditional touch technology described above. The on-cell technology is to dispose sensors on the back side of a color filter substrate to form a completed color filter substrate. One of the on-cell touch technologies is provided to dispose touch sensors on a thin film and then bond the thin film onto the upper one of the two substrates.

The in-cell technology is to dispose the sensors within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

There is older touch control technology known as out-cell, which is typically applied to the resistive and capacitive touch panels. The out-cell touch technology is provided to add a touch module onto a display module. The touch module and the display module can be manufactured by the two separate parties.

However, for all the in-cell, on-cell and out-cell touch technologies, they all need a transparent sensing electrode layer to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Furthermore, because the distance between the transparent sensing electrode layer and the common electrode (Vcom) layer of the LCD display panel is very tiny, the capacitance formed by the finger and the transparent sensing electrode layer is much smaller than that formed by the transparent sensing electrode layer and the common electrode (Vcom) layer when performing touch sensing with the transparent sensing electrode layer. Therefore, for calculating the touched coordinate by using the touch sensing of the transparent sensing electrode layer, the variation of values obtained from different sensing electrodes becomes too small to distinguish, which is disadvantageous to coordinate calculation. That is, due to the capacitance between the transparent sensing electrode layer and the finger being much smaller than that between the transparent sensing electrode layer and the common electrode (Vcom) layer, the capacitance between the transparent sensing electrode layer and the finger is likely to be influenced by the capacitance between the transparent sensing electrode layer and the common electrode (Vcom) layer, resulting in decreasing the accuracy of touch sensing. Therefore, it desired for the aforementioned touch display panel system to be improved.

SUMMARY OF THE INVENTION

The object of the present invention is to provide an in-cell touch display panel system using metal wires to connect with sensing electrodes, which greatly decreases the weight and thickness of a TFT touch LCD panel and also significantly reduces the material and manufacturing cost, while increasing the accuracy of touch sensing.

To achieve the object, there is provided an in-cell touch display panel system using metal wires to connect with sensing electrodes, which includes: a first substrate; a second substrate parallel to the first substrate; a liquid crystal layer configured between the first substrate and the second substrates; a black matrix layer disposed on one surface of the first substrate facing the liquid crystal layer, the black matrix layer being composed of a plurality of opaque lines; a sensing electrode trace layer disposed on one surface of the black matrix layer facing the liquid crystal layer, the sensing electrode trace layer being composed of a plurality of trace conductor lines; an insulation layer disposed on one surface of the sensing electrode trace layer facing the liquid crystal layer; and a sensing electrode layer disposed on one surface of the insulation layer facing the liquid crystal layer, the sensing electrode layer being composed of a plurality of transparent sensing electrodes obtained from patterning a common voltage layer, wherein each transparent sensing electrode is connected with at least one trace conductor line, and the plurality of trace conductor lines are disposed corresponding to positions of the plurality of opaque lines of the black matrix layer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
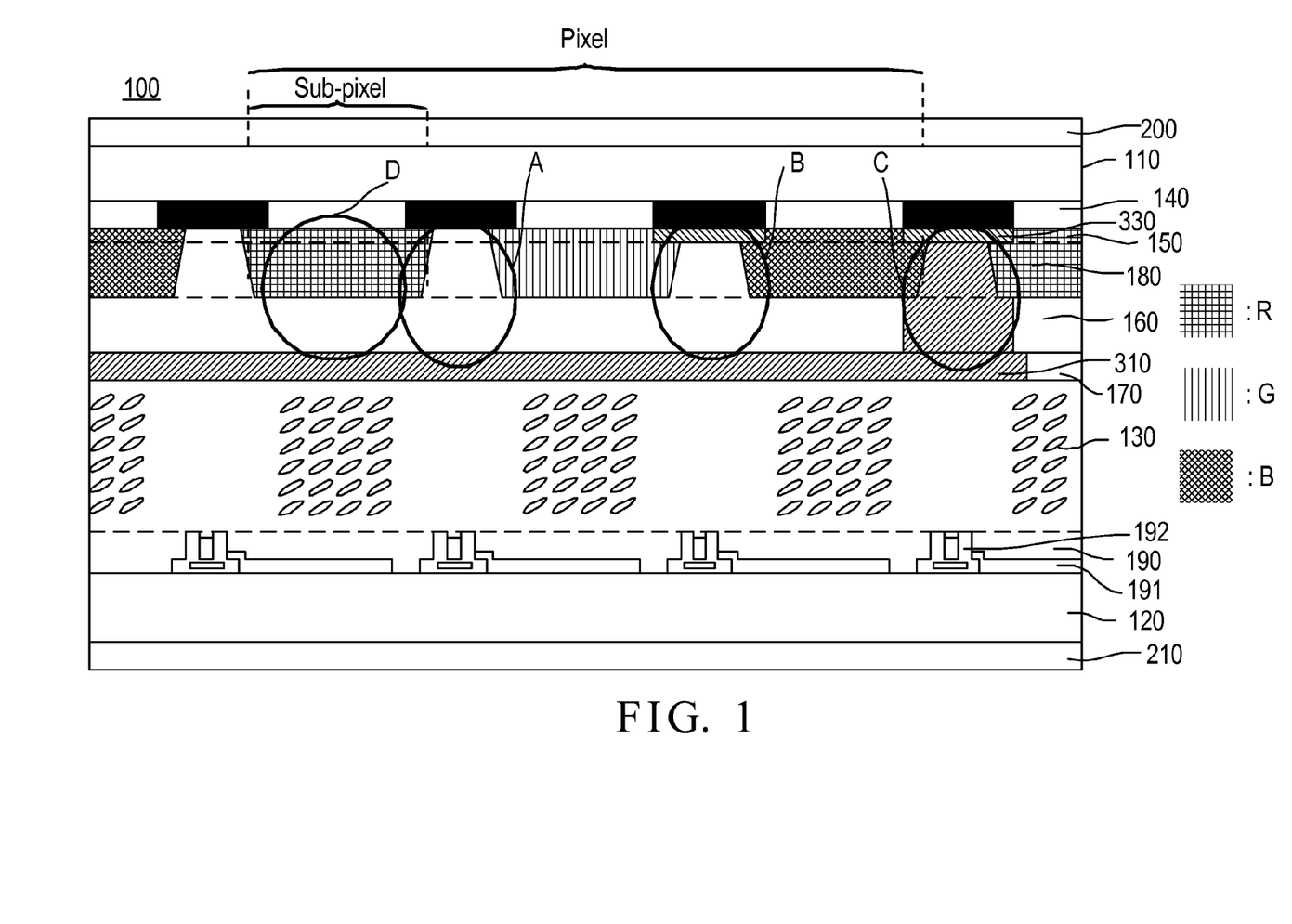
FIG. 1 illustrates a stack-up diagram for an embodiment of an in-cell touch display panel system using metal wires to connect with sensing electrodes.

In a stack-up diagram of a preferred embodiment of the present invention, an in-cell touch display panel system using metal wires to connect with sensing electrodes 100, as shown in FIG. 1, includes a first substrate 110, a second substrate 120, a liquid crystal layer 130, a black matrix layer 140, a sensing electrode trace layer 150, an insulation layer 160, a sensing electrode layer 170, a color filter layer 180, a thin film transistor layer 190, a first polarizer layer 200, and a second polarizer layer 210.

The first substrate 110 and the second substrate 120 are preferably glass substrates and are parallel to each other. The liquid crystal layer 130 is disposed between the first and second substrates 110, 120.

The black matrix layer 140 is between the first substrate 110 and liquid crystal layer 130 and is disposed on one surface of the first substrate 110 that faces the liquid crystal layer 130. The black matrix layer 140 is composed of a plurality of opaque lines.

Figure 2:
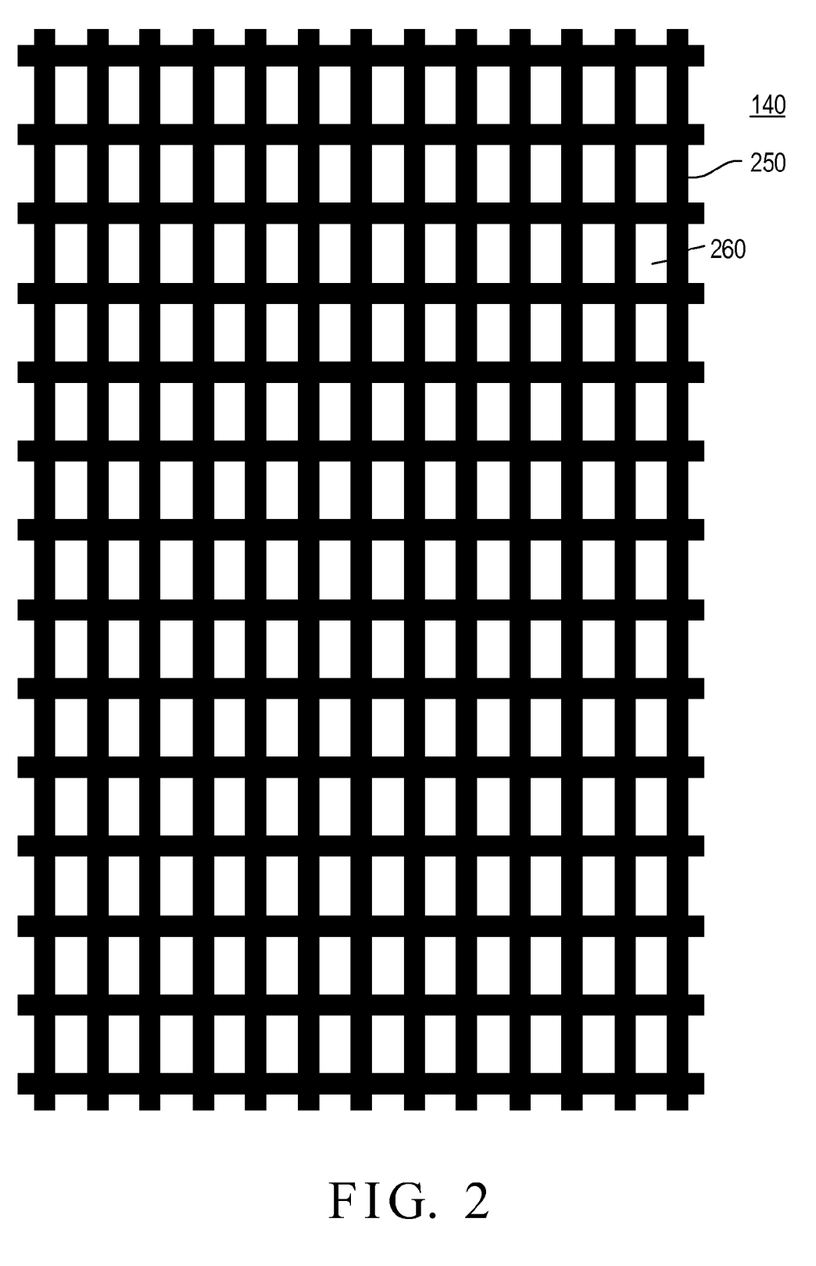
FIG. 2 is a schematic diagram of the black matrix layer.

FIG. 2 shows the black matrix layer 140, which is the same as that of the prior LCD panel. As shown in FIG. 2, the black matrix layer 140 is composed of lines 250 of insulating material that are black and opaque. The lines 250 of black insulating material are arranged as a checkerboard pattern and the color filter 180 is disposed among the spaces 260 defined by the lines 250 of black insulating material. It is noted that the dimension and the arrangement of the lines 250 of insulating material and the spaces 260, as shown in FIG. 2, are for illustrative purpose only, but not in actual dimension scale and ratio.

In the present invention, the sensing electrode layer 170 is Obtained from patterning the common electrode (Vcom) layer of the prior LCD panel, and the sensing electrode trace layer 150 is disposed on the surface of the black matrix layer 140 that faces the liquid crystal layer 130. The sensing electrode layer 170 has a sensing touch pattern structure patterned thereon, and the electrical signal sensed thereby is transmitted via the sensing electrode trace layer 150 to a controller (not shown), so as to determine the touch position. Therefore, there is no need to dispose an extra sensing electrode layer (ITO) on the upper glass substrate or lower glass substrate of the prior LCD panel, thereby saving the manufacturing cost, simplifying the assembly procedure and further improving the panel yield.

Figure 3:
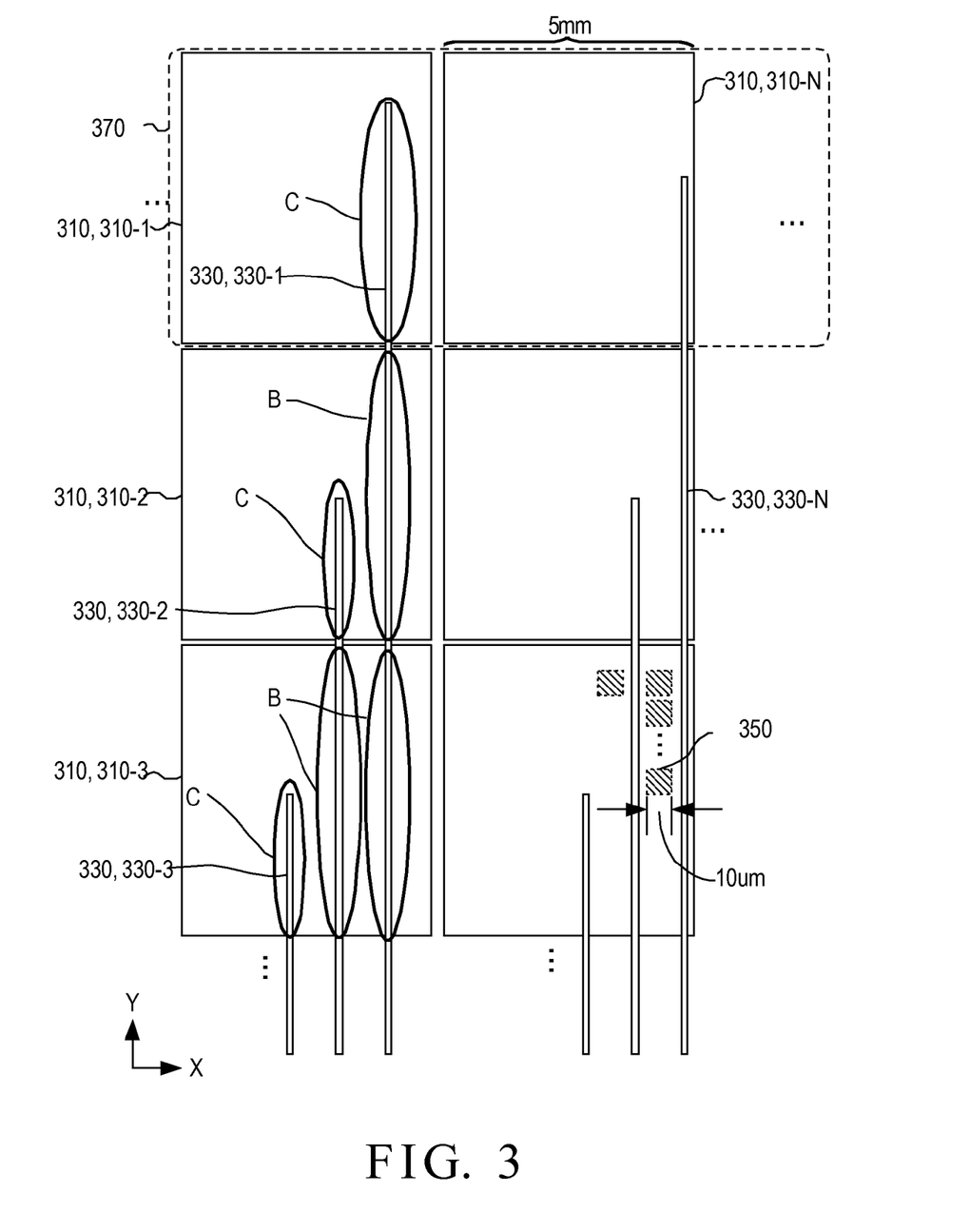
FIG. 3 is a schematic diagram of the sensing electrode layer.

FIG. 3 is a schematic diagram of the sensing electrode layer 170 in accordance with the present invention, which is viewed from the first substrate 110 to the second substrate 120, i.e. from the upper substrate to the lower substrate of the prior LCD panel. As shown in FIG. 3, the sensing electrode layer 170 is converted from a common electrode (Vcom) layer. That is, the sensing electrode layer 170 is composed of a plurality of transparent sensing electrodes 310 obtained from patterning the common electrode (Vcom) layer.

The sensing electrode trace layer 150 is disposed on a surface of the black matrix layer 140 that faces the liquid crystal layer 130. The sensing electrode trace layer 150 is composed of a plurality of trace conductor lines 330. The plurality of trace conductor lines 330 are disposed at positions corresponding to the positions of the plurality of opaque lines 250 of the black matrix layer 140.

The insulation layer 160 is disposed on a surface of the sensing electrode trace layer 150 that faces the liquid crystal layer 130. As shown by the oval "A" in FIG. 1, insulation material is filled in the portion of the insulation layer 160 where there is no trace conductor line 330 corresponding thereto. Further, as shown by the oval "B" in FIG. 1, insulation material is filled in the portion of the insulation layer 160 where there is trace conductor line 330 corresponding thereto if there is no need to connect the sensing electrode layer 170 with the trace conductor line 330. Yet further, as shown by the oval "C" in FIG. 1, indium tin oxide (ITO) or other conductive material, such as aluminum, barium and chromium, is filled in the portion of the insulation layer 160 where there is trace conductor line 330 corresponding thereto, to make an electrical connection of the sensing electrode layer 170 and the trace conductor line 330. Still further, as shown by the oval "D" in FIG. 1, insulation material filled therein has to allow light pass through and thus the insulation material is preferred to be transparent.

As shown in FIG. 3, the plurality of transparent sensing electrodes 310 of the sensing electrode layer 170 are arranged in a first direction (X-direction) and a second direction (Y-direction), wherein the first direction is substantially vertical with the second direction. The plurality of transparent sensing electrodes 310 of the sensing electrode layer 170 are made of conductive indium tin oxide (ITO).

The plurality of transparent sensing electrodes 310 are N quadrilateral regions 310-1, 310-2, 310-3, ..., 310-N and any two quadrilateral regions are not electrically connected with each other, so as to form a single-layered sensing touch pattern on the sensing electrode layer 170, where N is an integer greater than one. The quadrilateral region is formed in a rectangle, square, or rhombus shape.

It is to be understood that the touch sensing electrodes 310 are not limited to that illustrated herein, but can be a diagonal, circular, radial, and like arrangements according to the needs of the touch display panel.

Each transparent sensing electrode 310 is connected with at least one trace conductor line 330. The trace conductor lines 330 that are connected with different transparent sensing electrode 310 are not connected with each other. In this embodiment, the plurality of trace conductor lines 330 of the sensing electrode trace layer 150 include N trace conductor lines 330-1, 330-2, 330-3, ..., 330-N, which are made of conductive metal material or alloy material. The conductive metal material can be chromium, barium or aluminum.

As shown in FIG. 3, the trace conductor line 330, 330-1 is electrically connected with the transparent sensing electrode 310-1 via ITO or other conductive material, such as aluminum, barium and chromium, filled therebetween, as shown by the oval "C" in FIG. 1, When the trace conductor line 330-1 goes down and passes through the transparent sensing electrode 310-2, due to the trace conductor line 330-1 and the transparent sensing electrode 310-2 both being conductive, insulation material is arranged between the trace conductor line 330-1 and the transparent sensing electrode 310-2, as shown by the oval "B" in FIG. 1. The remaining trace conductor lines 330 and transparent sensing electrodes 310 have the same arrangement and thus a detailed description therefore is deemed unnecessary. It is noted that, for the purpose of clearly illustrating the trace conductor lines 330 and the transparent sensing electrodes 310, the insulation layer 160 is not shown in FIG. 3.

Figure 4A:
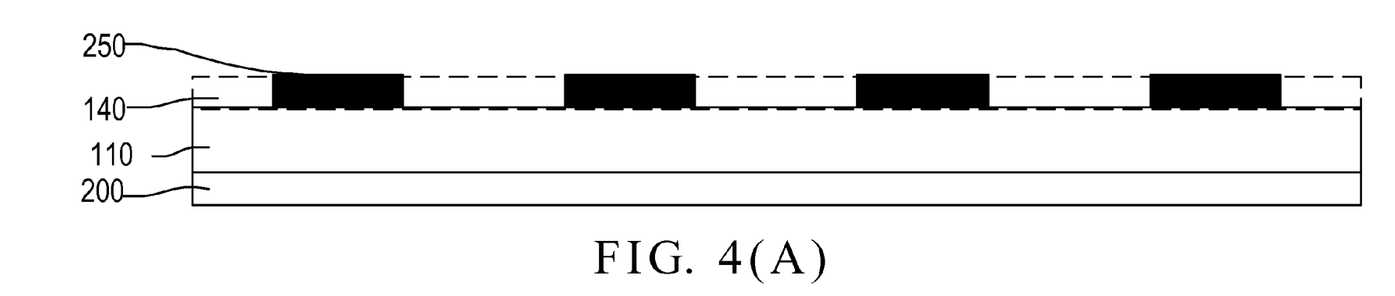
FIGS. 4(A) to 4(G) illustrate the manufacture process of the in-cell touch display panel system using metal wires to connect with sensing electrodes in accordance with the present invention.
Figure 4B:
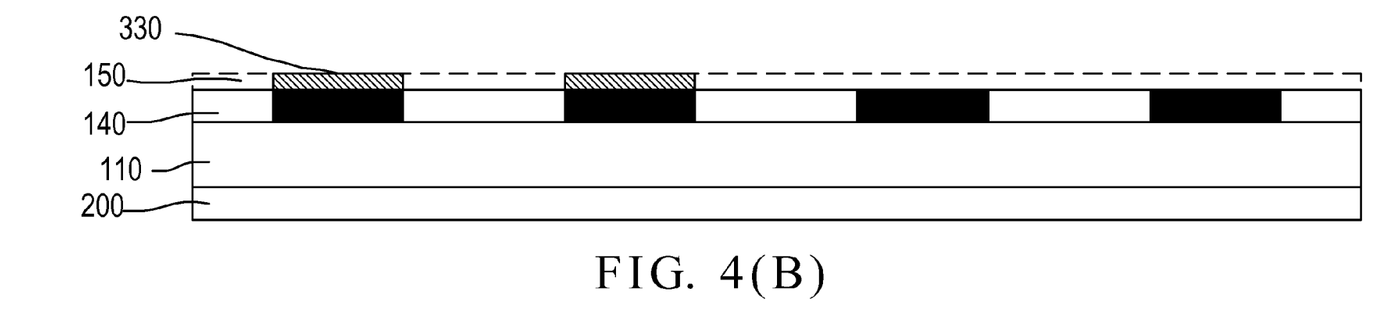
Figure 4C:
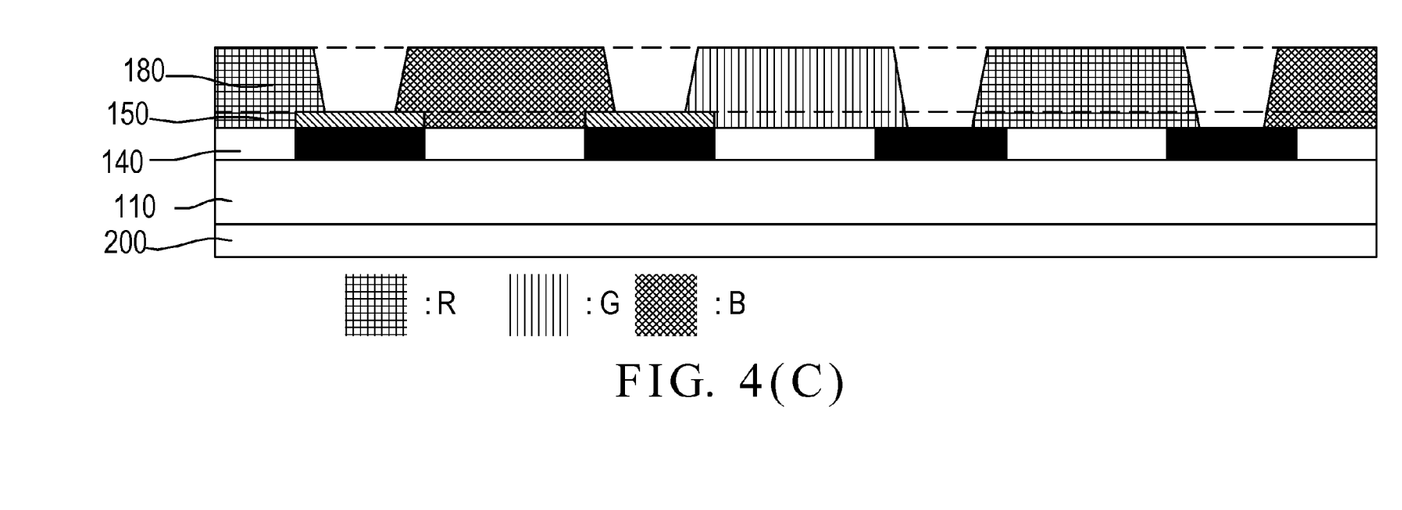
Figure 4D:
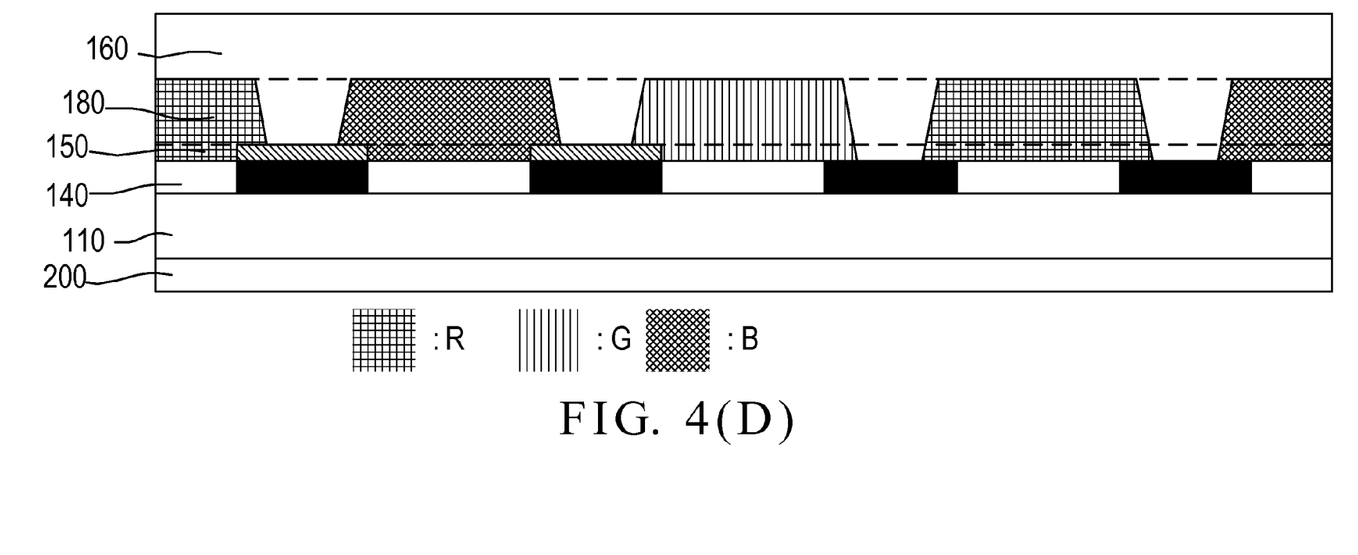
Figure 4E:
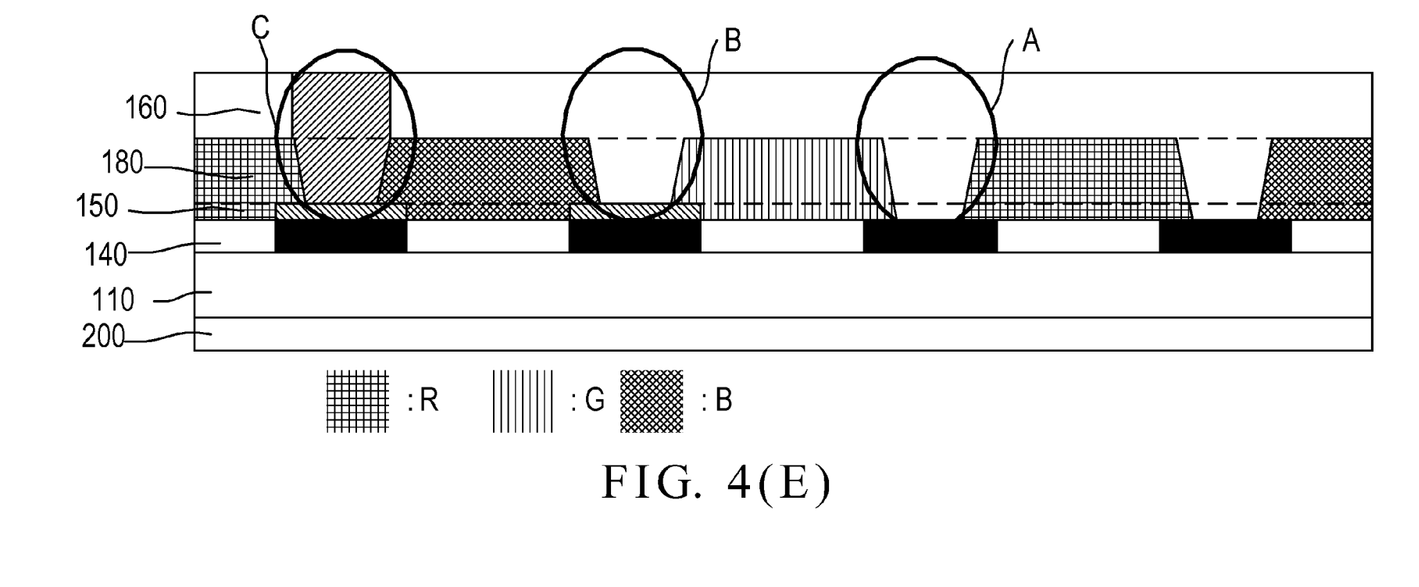
Figure 4F:
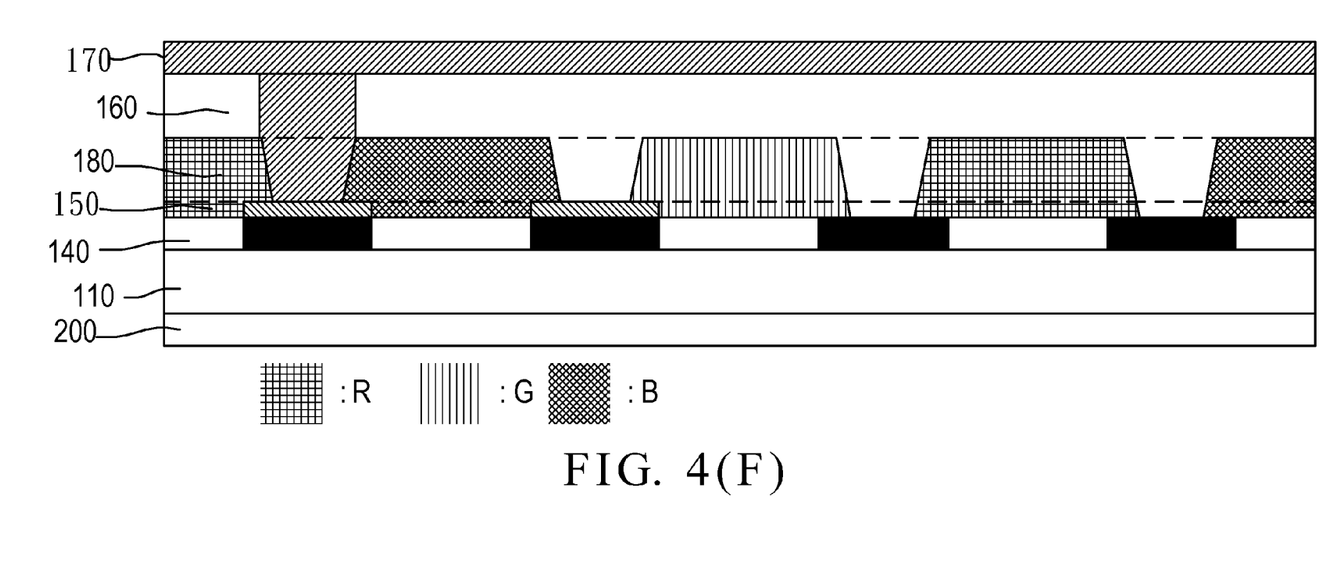
Figure 4G:
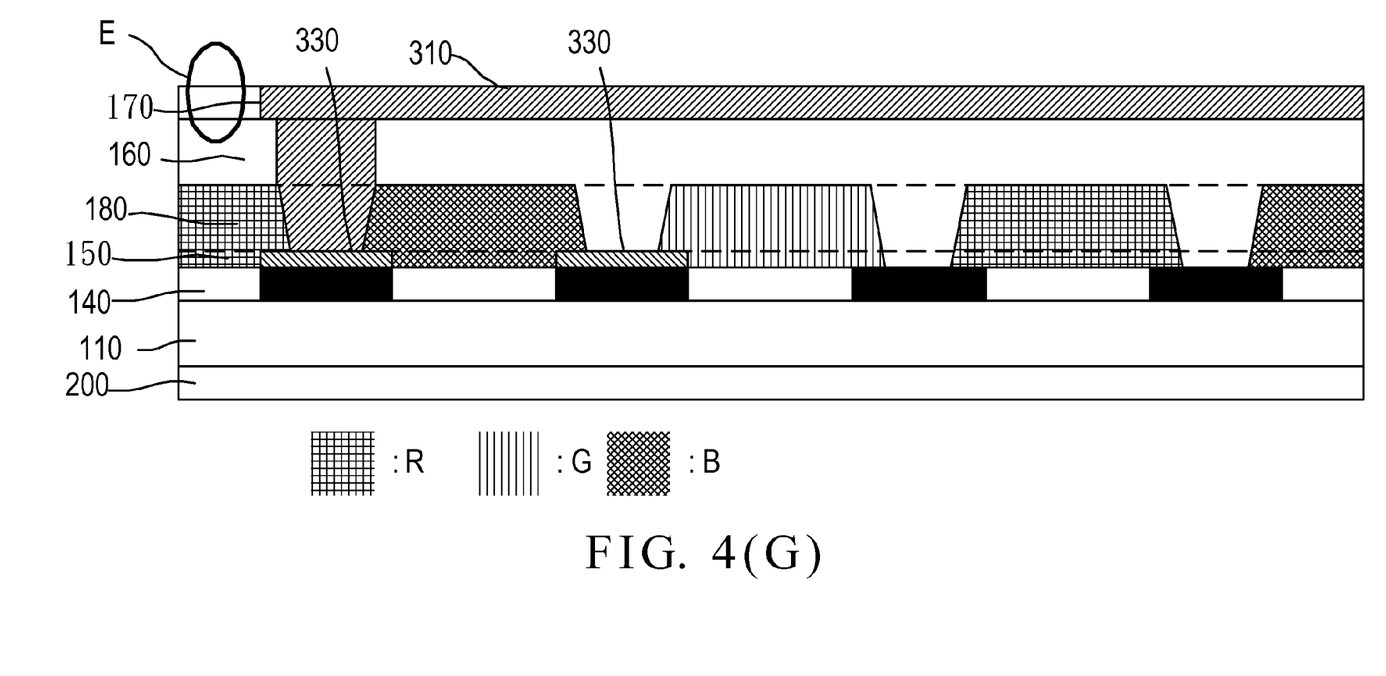

FIGS. 4(A) to 4(G) illustrate the manufacture process of the in-cell touch display panel system using metal wires to connect with sensing electrodes in accordance with the present invention. With reference to FIG. 4(A), it first forms the black matrix layer 140 on the first substrate 110. With reference to FIG. 4(B), the trace conductor lines 330 of the sensing electrode trace layer 150 are then formed on the opaque lines 250 of the black matrix layer 140. With reference to FIG. 4(C), the color filter layer 180 is subsequently formed on the black matrix layer 140 and the trace conductor lines 330. With reference to FIG. 4 (D), the insulation layer is then formed on the color filter layer 180. With reference to FIG. 4(E), the portion of the insulation layer corresponding to the trace conductor line 330 is removed by etching to leave space for filling or laying conductive material, as indicated by the oval "C". With reference to FIG. 4(F), ITO is employed to coat the whole layer so as to form the sensing electrode layer 170 and, because there is a removed portion at oval "C", the sensing electrode layer 170 is electrically connected with the trace conductor line 330. With reference to FIG. 4(G), an etching process is performed on the sensing electrode layer 170, as indicated by the oval "E", so as to form a plurality of transparent sensing electrodes 310 on the sensing electrode layer 170.

As shown in FIG. 3, the size of a transparent sensing electrode 310 is about 5 mm, while the size of a sub-pixel 350 is about 50 to 100 μm. Therefore, one edge of the transparent sensing electrode 310 may correspond to 50 to 100 sub-pixels. That is, one edge of the transparent sensing electrode 310 may correspond to as many as one hundred opaque lines 250. In the present invention, the width of the trace conductor line 330 is slightly smaller than that of the opaque line 250, and the plurality of trace conductor lines 330 are disposed to overlap with the opaque lines 250, so that the electrical signal sensed by the transparent sensing electrode 310 is transmitted to a controller (not shown) via the trace conductor lines 330 of the sensing electrode trace layer 150, thereby determining the touched position. That is, the transparent sensing electrodes 310 forming the sensing electrode layer 170 also function as the prior common electrode (Vcom) layer. Accordingly, there is no need to dispose an extra sensing electrode layer on the upper glass substrate or lower glass substrate of the prior LCD panel, thereby saving the manufacturing cost, simplifying the assembly procedure, improving the production yield, increasing the light penetration rate and decreasing the power consumption.

While displaying pixel data, the controller can enable the transparent sensing electrodes 310 of the same row to be electrically connected together, as indicated by the row 370 in FIG. 3, so that the transparent sensing electrodes 310 of the same row are able to form a common electrode (Vcom) as used in the prior LCD panel.

The trace conductor lines 330 are made of conductive metal material or alloy, which has impedance much smaller than that of the transparent conductive ITO. Therefore, the line width of the trace conductor line 330 can be made relatively thin, and thus the trace conductor lines 330 can be disposed below the opaque lines 250 without affecting the aperture ratio.

Figure 5:
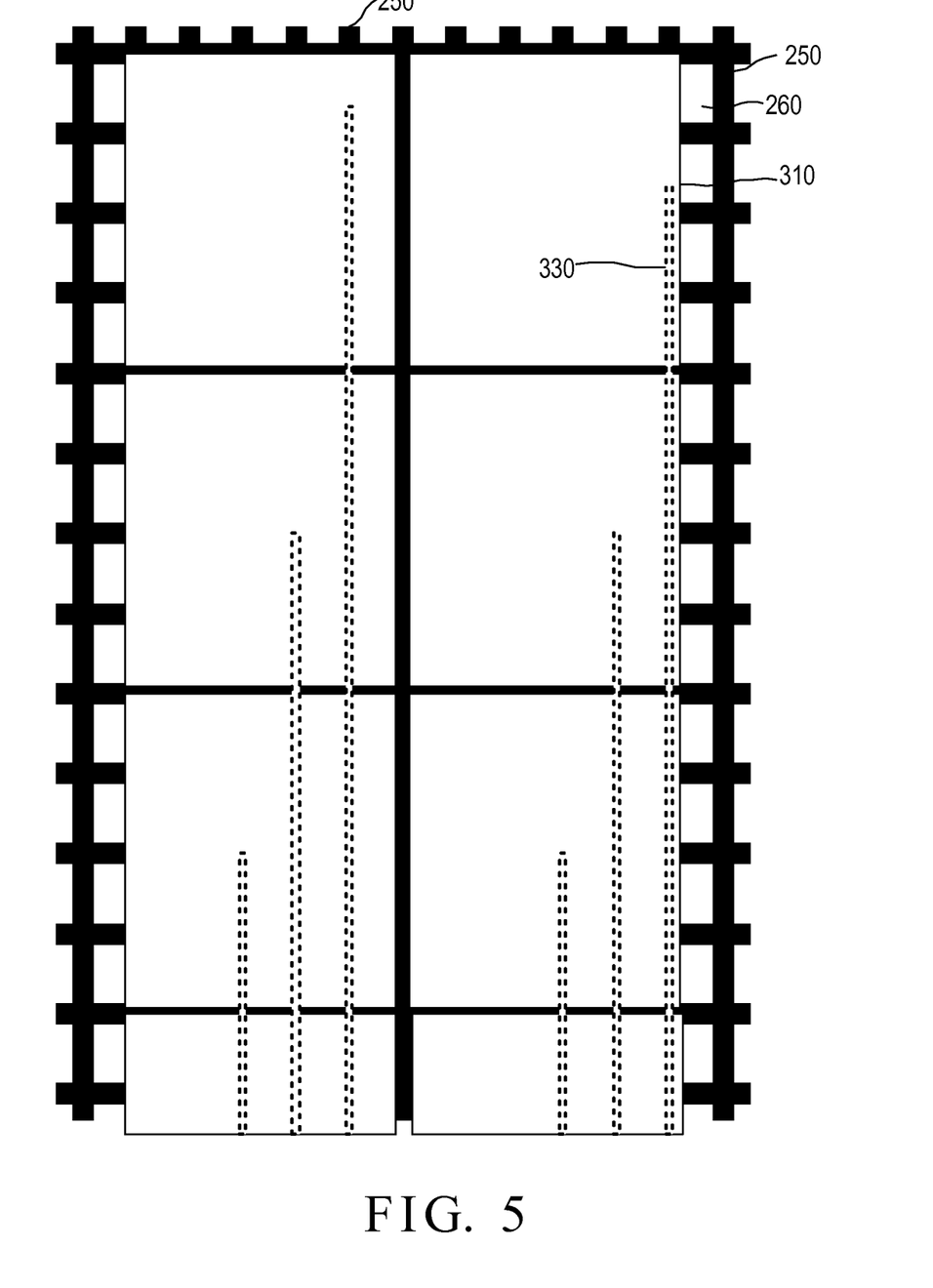
FIG. 5 illustrates the black matrix layer, the sensing electrode layer and the sensing electrode trace layer in accordance with the present invention.

FIG. 5 illustrates the black matrix layer 140, the sensing electrode layer 170 and the sensing electrode trace layer 150 in accordance with the present invention, which is viewed from the second substrate 120 to the first substrate 110, so that the trace conductor lines are represented by dotted lines. As shown, it is a schematic diagram of overlapping the black matrix layer 140, the sensing electrode layer 170 and the sensing electrode trace layer 150.

As shown in FIG. 5, the transparent sensing electrodes 310 are employed to form a single-layered sensing touch pattern structure on the sensing electrode layer 170.

The width of the trace conductor line 330 is slightly smaller than that of the opaque line 250. When viewing from the first substrate 110 to the second substrate 120, the trace conductor lines 330 can be sheltered by the opaque lines 250 and thus only the opaque lines 250 can be seen by users while the trace conductor lines 330 are invisible to users.

In the prior art, the sensing electrode layer and the common electrode layer are seperately provided and there is a distance therebetween. When performing touch sensing with the transparent sensing electrode layer, the capacitance between a finger and the transparent sensing electrode layer is much smaller than that between the transparent sensing electrode layer and the common electrode layer. Therefore, the capacitance between the transparent sensing electrode layer and a finger is likely to be influenced by the capacitance between the transparent sensing electrode layer and the common electrode layer, resulting in decreasing the accuracy of touch sensing. In the present invention, the sensing electrode layer 170 also functions as the common voltage layer and thus there is no capacitance formed when performing touch sensing with the transparent sensing electrode layer as the common voltage layer is replaced by the transparent sensing electrodes 310, so that the capacitance between the transparent sensing electrode 310 and a finger will not be influenced, thereby increasing the accuracy of touch sensing.

The color filter layer 180 is disposed on a surface of the black matrix layer 140 that faces the liquid crystal layer 130.

The thin film transistor layer 190 is disposed on a surface of the second substrate 120 that faces the liquid crystal layer 130. The thin film transistor layer 190 is composed of thin film transistors 192 and transparent electrodes 191.

The first polarizer layer 200 is disposed on one surface of the first substrate 110 opposite to the other surface of the first substrate 110 facing the liquid crystal layer 130.

The second polarizer layer 210 is disposed on one surface of the second substrate 120 opposite to the surface of the second substrate 120 facing the liquid crystal layer 130.

In view of the foregoing, it is known that the present invention is capable of forming a single-layered touch pattern on the sensing electrode layer 170, which has the advantage of not requiring to arrange an additional transparent conductive layer as a sensing electrode layer on the upper glass substrate or lower glass substrate of the LCD panel, thereby lowering the cost and decreasing the number of manufacturing steps. Furthermore, because the sensing electrode layer 170 also plays as the common voltage layer, the capacitance between the transparent sensing electrode 310 and a finger will not be influenced when performing touch sensing with the transparent sensing electrode layer as the common voltage layer is transferred to the transparent sensing electrodes 310, so that the accuracy of touch sensing can be significantly increased.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel system using metal wires to connect with sensing electrodes, comprising:
   a first substrate;
   a second substrate parallel to the first substrate;
   a liquid crystal layer configured between the first substrate and the second substrates;
   a black matrix layer disposed on one surface of the first substrate facing the liquid crystal layer, the black matrix layer being composed of a plurality of opaque lines;
   a sensing electrode trace layer disposed on one surface of the black matrix layer facing the liquid crystal layer, the sensing electrode trace layer being composed of a plurality of trace conductor lines;
   an insulation layer disposed on one surface of the sensing electrode trace layer facing the liquid crystal layer; and
   a sensing electrode layer disposed on one surface of the insulation layer facing the liquid crystal layer, the sensing electrode layer being composed of a plurality of transparent sensing electrodes obtained from patterning a common voltage layer so that the sensing electrode layer also plays as the common voltage layer, wherein each transparent sensing electrode is connected with at least one trace conductor line, and the plurality of trace conductor lines are disposed corresponding to positions of the plurality of opaque lines of the black matrix layer;

wherein the plurality of transparent sensing electrodes are N quadrilateral patches, every transparent sensing electrode is a quadrilateral patch, and any two quadrilateral patches are not electrically connected with each other on the sensing electrode layer, so as to form a single-layered sensing touch pattern on the sensing electrode layer, where N is an integer greater than one.

2. The in-cell touch display panel system using metal wires to connect with sensing electrodes as claimed in claim 1, wherein the trace conductor lines connecting with different transparent sensing electrode are not connected with each other.

3. The in-cell touch display panel system using metal wires to connect with sensing electrodes as claimed in claim 2, wherein the plurality of transparent sensing electrodes of the sensing electrode layer are arranged in a first direction and a second direction.

4. The in-cell touch display panel system using metal wires to connect with sensing electrodes as claimed in claim 3, wherein the first direction is substantially perpendicular to the second direction.

5. The in-cell touch display panel system using metal wires to connect with sensing electrodes as claimed in claim 4, further comprising:

a color filter layer disposed on a surface of the black matrix layer facing the liquid crystal layer.

6. The in-cell touch display panel system using metal wires to connect with sensing electrodes as claimed in claim 5, further comprising:

a thin film transistor layer disposed on one surface of the second substrate facing the liquid crystal layer.

7. The in-cell touch display panel system using metal wires to connect with sensing electrodes as claimed in claim 6, wherein the quadrilateral patch is formed in a rectangle, square, or rhombus shape.

8. The in-cell touch display panel system using metal wires to connect with sensing electrodes as claimed in claim 7, wherein the plurality of trace conductor line of the sensing electrode trace layer are made of conductive metal material or alloy material.

9. The in-cell touch display panel system using metal wires to connect with sensing electrodes as claimed in claim 8, wherein the conductive metal material is chromium, barium or aluminum.

10. The in-cell touch display panel system using metal wires to connect with sensing electrodes as claimed in claim 9, wherein the plurality of transparent sensing electrodes of the sensing electrode layer are made of conductive indium tin oxide (ITO).

* * * * *